Oct. 8, 1957     C. J. DE GRAVE, JR     2,808,762
LENS MOUNTING MEANS
Filed June 25, 1956
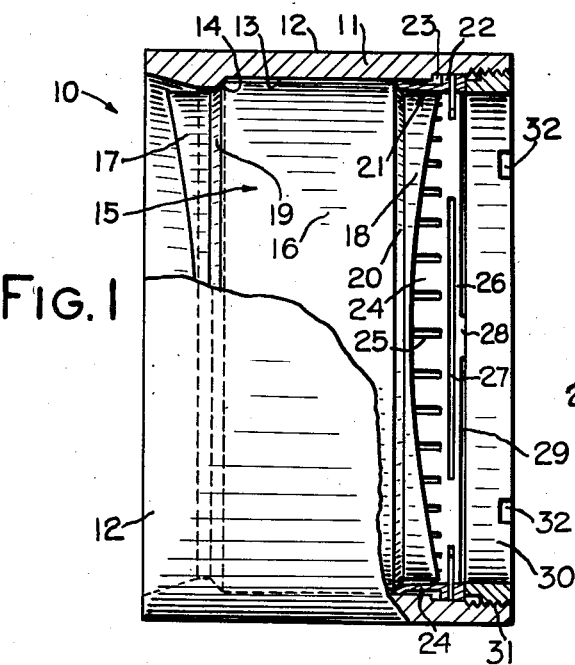
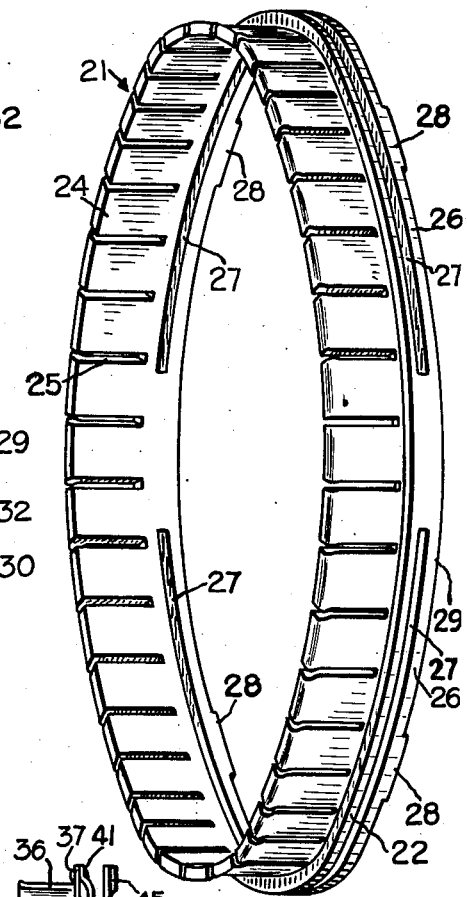
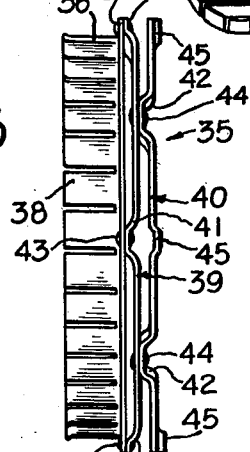
INVENTOR.
CHARLES J. DeGRAVE JR.
BY
ATTORNEY

United States Patent Office 2,808,762
Patented Oct. 8, 1957

2,808,762

LENS MOUNTING MEANS

Charles J. De Grave, Jr., Chili, N. Y., assignor to Bausch & Lomb Optical Company, Rochester, N. Y., a corporation of New York Application June 25, 1956, Serial No. 593,684

3 Claims. (Cl. 88—57)

This invention relates to lens mounting devices and more particularly it relates to improved means for clamping and positioning a lens in a mounting.

For ordinary lens mountings, the centration of the lens in its mounting is provided either by supporting the lens on its outer diameter or by seating a deeply curved refractive lens surface against an abutment shoulder. Either of these constructions is satisfactory for meeting centration requirements for ordinary spherical lenses used under average conditions. However, when very critical centering of the lens is required, as for instance for the cylindrical lenses used in anamorphic lens systems, neither of the above-mentioned methods is satisfactory. This is true since ample clearance spaces must be provided between the outside diameter of the lens and the lens holding bore for assembly purposes and these spaces permit the lens to shift when it is subjected to high heat such as that present in certain types of movie projection machines.

It is an object of this invention to provide lens clamping and positioning means which reliably holds a round lens, particularly one having cylindrical refractive surfaces or the like, reliably stationary and accurately centered and free from axial tilt in its mounting regardless of the effects of differential expansion and contraction with respect to the various components of the mounting. A further object is to provide means for automatically centering the lens in its mounting as a companion operation which is accomplished simultaneously during the clamping of the lens. Another object is to provide such a device which is simple and easy to install, is adaptable to various clamping conditions and is of durable construction. Further objects and advantages will be found in the details of construction, arrangement and combination of parts by reference to the specification herebelow together with the accompanying drawing in which:

Fig. 1 is a side elevational partly in section showing a preferred form of my invention, Fig. 2 is a perspective view of the positioning ring, and Fig. 3 is a side elevation of a second form of positioning ring.

In the preferred form of the invention shown in Fig. 1, the lens mounting is generally designated by the numeral 10. Comprised in the mounting is a lens cell or barrel 11 having an outer surface 12 which is suitably formed so as to be securely fitted into a frame or lens carrier, not shown. The lens cell 11 is provided interially with a bore 13 which terminates at one end in an inclined inwardly extending abutment shoulder 14 A lens 15 having a peripheral cylindrical surface 16 and two round end surfaces 17 and 18 is loosely fitted within the bore 13 by reason of generous clearance spaces between these surfaces 16, 17 and 18 and their respective bores in said lens cell 11.

According to this invention, the outer surface of the lens 15 is provided with a pair of equally spaced and mutually inclined bevels or seating surfaces 19 and 20, the surface 19 being seated against the abutment shoulder 14. The bevels or seating surfaces 19 and 20 are formed so that they are concentric to and symmetrical with the optical axis of the lens 15. Especially in the case of the cylindrical lens shown in Fig. 1, it is essential that the lens be carefully centered and reliably secured against any tilt of its cylindrical axis even though the lens is used in atmospheres of high temperature so that the parts of the mounting differentially expand and tend to release the lens 15. For this purpose, there is provided a novel lens positioning ring 21 which has an outer circumferential bearing surface 22 that is slidably mounted in a short bore 23 in the cell 11 adjacent to the bore 13. As best shown in Fig. 2, the lens positioning ring 21 is an integral structure having two resilient sections formed of spring metal. The front section is composed of resilient fingers 24 which extend substantially parallel to the axis of the ring and are produced by forming longitudinal slots 25 in a cylindrical part of the ring 21. The resilient fingers 24 may therefore be moved in a radial direction relative to the ring 21. Preferably, the outer contacting edges of said fingers 24 are beveled or rounded so as to act smoothly on the inclined seating surface 20 as clamping pressure is applied longitudinally to said positioning ring. The application of said clamping pressure to the seating surface 20 causes the lens 15 to be centered as the inclined seating surface 19 is forced against the abutment shoulder 14, the tips of the fingers 24 being forced outwardly into wedging position against the bore 13 to augment the lens centering action.

In the rear part of the ring 21, longitudinally resilient elements 26 are formed so that said clamping pressure is transmitted through the elements to said spring fingers 24. As shown in Fig. 2, said elements 26 are provided by forming four circumferential slots 27 in the lens positioning ring 21 rearwardly of the fingers 24 and pressure is applied to these resilient elements 26 through four protruding lugs 28 formed at the midportion of each such element on the rear surface 21 of the ring.

Pressure is applied to the lugs 28 to clamp the lens by a clamping ring 30 which is threaded at 31 on its outer diameter into the end of the lens cell 11 and is screwed up against said lugs 28 by the use of a spanner wrench which engages in wrench slots 32 provided in the clamping ring.

In assembling the above-described device, the lens 15 is inserted into the bore 13 and the lens seat 19 is set against the abutment shoulder 14 of the lens cell. The unitary positioning ring 21 is then inserted in its bore 23 and the clamping ring 30 is screwed up against the lugs 28. Further application of pressure on said lugs causes the spring fingers 24 to slide upwardly on the lens seat 20 against an increasing spring pressure in the spring fingers into contact with the bore 13.

As the resistance to flexure of the spring fingers increases, the resilient elements or bars 26 at the rear of the ring are progressively depressed in a direction parallel to the axis of the mounting in transmitting the clamping pressure. With the lens 15 properly clamped in its mounting, it can be used in abnormally hot atmospheres without dislocation of its optical axes since the differential expansion of the various parts of the mounting and the lens are fully compensated by the expansion and contraction of the spring fingers 24 on the seating surface 20. The spring fingers when forced against the bore 13 are equally effective as a lens centering member regardless of the temperature of the atmosphere in which the lens is placed whether they are used in combination with the inclined seating surface 19 and its inclined abutment 14.

In Fig. 3 there is shown a second form of my positioning ring, similar to the preferred form, wherein, the resilient elements are formed on two suitably pressed metal pieces which are permanently united. In this form of the invention, the positioning ring, generally indicated by the numeral 35, comprises a thin cylindrical tube or body 36 on which a radial flange 37 and a multiplicity of spring fingers 38 are formed. The axially or longitudinally resilient section is formed by one or more indented flat spring rings 39 and 40. These rings may all be provided with offset parts 41 on one side only as shown on ring 39 or may all be provided with alternate offset parts 42 on opposite sides as shown on ring 40. The offset parts 41 and the radial flange 37 have aligned holes in which rivets 43 are set to unite these parts. When additional indented springs 40 are used in this assembly, the offset parts 42 are permanently secured to the spring ring 39 by welding or riveting at 44 at points midway between the offset parts 41 so as to obtain maximum resilience. Raised portions 45 are provided on spring ring 40, corresponding to the lugs 28 on the positioning ring 21, midway between the offset parts 42 and opposite thereto whereby the clamping ring 30 transmits force to the positioning ring 35 for clamping the lens 15.

It will be perceived from the foregoing description that there is here provided means for solidly and reliably clamping and retaining a lens, particularly a cylindrical type of lens, in perfect alignment and centered condition in its mounting regardless of continuous use in hot atmospheres, such as found in modern movie projectors. It is obvious that changes may be made in the form and arrangement of the parts of the invention and substitutions may be made therein without departing from the spirit of the invention as defined in the appended claims.

I claim:

1. In a lens mounting, a barrel provided with a longitudinal bore and an abutment shoulder formed inwardly at one end thereof, a lens loosely fitted within said bore and a seating surface formed thereon so as to fit and lie against said shoulder, means for securing said lens against said shoulder comprising an annular inclined seating surface formed parallel with and adjacent to said seating surface on the periphery of the lens concentric with its optical axis, a positioning ring slidably supported adjacent to said lens and having a multiplicity of radially movable resilient fingers which bear against said inclined seating surface and having integrally in tandem therewith a plurality of longitudinally resilient elements formed circumferentially of said ring wherein clamping thrust is applied, and clamping means operatively connected to said barrel and said longitudinally resilient elements for forcing said ring against said inclined seating surface whereby the action of the radially resilient fingers upon said inclined seating surface and said bore clamp the lens and optically center it in said bore regardless of the differential expansion and contraction of the component parts of the mounting due to changes in ambient temperature.

2. A lens mounting comprising the combination of a lens holding barrel having a cylindrical bore, an inclined annular abutment shoulder formed inwardly adjacent to one end of said barrel, a lens loosely fitted within said bore, a pair of annular and parallel seating surfaces formed peripherally on opposite ends of said lens and inclined toward each other so as to make acute angles with the lens axis, one of said surfaces being adapted to seat against said shoulder, a lens positioning ring slidably mounted to move longitudinally within said barrel and having longitudinally extending spring fingers formed along one side which bear adjacent their ends upon the other of said seating surfaces, circumferentially extending resilient means formed in said ring between said fingers and the opposite edge of said ring and clamping means bearing against said resilient means for forcing the fingers of said ring against the last-named inclined surface whereby said fingers expand into contact with said bore to maintain an effective clamping pressure on the lens regardless of differential dimensional changes in the component parts of said mechanism due to changes in their temperature.

3. A lens mounting comprising a barrel having a bore, an inclined abutment shoulder formed within the bore adjacent one end thereof, a lens which is loosely fitted within the bore, an inclined seating surface formed on the peripheral edge at each end of the lens concentric with its optical axis, said barrel having a second bore which is larger than the other bore and is formed at the other end of the barrel, a positioning ring slidably mounted in the second bore, said positioning ring having a plurality of longitudinally extending, spaced, resilient fingers, the free ends of the fingers being in engagement with the adjacent inclined seating surface on the lens, and a clamping ring threaded into the barrel in position to contact said positioning ring whereby pressure may be applied to urge said fingers against the adjacent seating surface and said first named bore and thereby center the lens in the barrel.

References Cited in the file of this patent

UNITED STATES PATENTS

| | | |
|---|---|---|
| 859,215 | Guilbert | July 9, 1907 |
| 1,111,093 | Preddey | Sept. 22, 1914 |
| 1,283,963 | Takahashi | Nov. 5, 1918 |
| 1,417,326 | Jacobson | May 23, 1922 |
| 1,876,384 | Arno | Sept. 6, 1932 |
| 2,203,660 | Young | June 4, 1940 |
| 2,477,896 | Pratt | Aug. 2, 1949 |
| 2,484,464 | Quigley et al. | Oct. 11, 1949 |